(12) United States Patent
Rothaar (10) Patent No.: US 8,717,342 B2
(45) Date of Patent: May 6, 2014

(54) SINUSOIDAL LASER SCANNER WITH OPTICAL FILTER

(75) Inventor: Bruce C. Rothaar, Woodinville, WA (US)

(73) Assignee: Microvision, Inc., Redmond, WA (US)

( * ) Notice: Subject to any disclaimer, the term of this patent is extended or adjusted under 35 U.S.C. 154(b) by 349 days.

(21) Appl. No.: 13/222,199

(22) Filed: Aug. 31, 2011

(65) Prior Publication Data

US 2013/0050156 A1 Feb. 28, 2013

(51) Int. Cl.
*G09G 5/00* (2006.01)

(52) U.S. Cl.
USPC .............. 345/207; 345/81; 345/108; 345/204

(58) Field of Classification Search
USPC ............. 345/102–111, 204–215, 76–86
See application file for complete search history.

(56) References Cited

U.S. PATENT DOCUMENTS

| 7,901,084 B2 * | 3/2011 | Willey et al. ............. 353/49 |
| 7,911,412 B2 * | 3/2011 | Benner et al. ............ 345/55 |
| 8,511,838 B2 * | 8/2013 | Rothaar .................. 353/99 |
| 2008/0048979 A1 * | 2/2008 | Ruttenberg .............. 345/158 |

* cited by examiner

*Primary Examiner* — Vijay Shankar
(74) *Attorney, Agent, or Firm* — Kevin D. Wills (57) ABSTRACT

A scanning projector includes an optical filter. The optical filter exhibits a variable attenuation as a function of position. The scanning projector may scan sinusoidally in at least one dimension. The variable attenuation of the optical filter compensates for brightness variations due to sinusoidal scanning.

16 Claims, 9 Drawing Sheets

SINUSOIDAL LASER SCANNER WITH OPTICAL FILTER

FIELD

The present invention relates generally to projection systems, and more specifically to scanning projection systems.

BACKGROUND

Scanning laser projectors typically scan a modulated laser beam in a raster pattern to display an image. Due to many possible factors, the resulting laser beam spot may traverse the raster pattern at a varying rate. For example, a sinusoidally scanned laser beam will produce a laser spot that traverses the raster pattern fastest near the center and slowest away from the center.

The varying rate of laser spot traversal may result in brightness variations in the displayed image. One way to combat these brightness variations is to increase resolution of analog-to-digital converters that drive laser light sources, but this increases cost.

DESCRIPTION OF EMBODIMENTS

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 1:
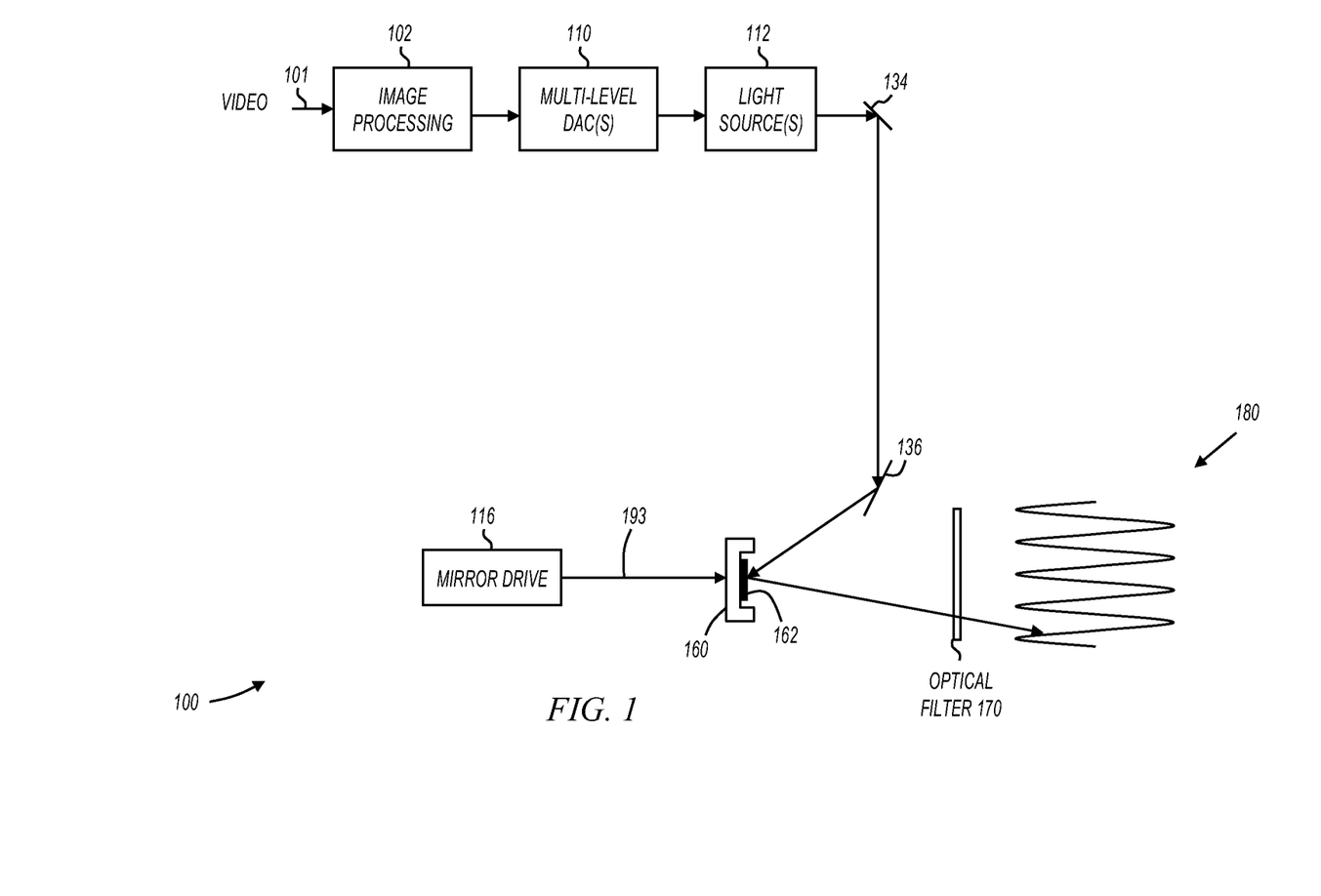
FIG. 1 shows a scanning laser projector in accordance with various embodiments of the present invention.

FIG. 1 shows a scanning laser projector in accordance with various embodiments of the present invention. Scanning laser projector 100 includes image processing component 102, multi-level digital-to-analog converter (DAC) 110, light source(s) 112, micro-electronic machine (MEMS) device 160 having scanning mirror 162, and mirror drive circuits 116. Scanning laser projector 100 also includes guiding optics 134, 136, and optical filter 170.

In operation, image processing component 102 receives video data on node 101 and produces display pixel data used to drive light source(s) 112 when pixels are to be displayed. The video data on node 101 represents image source data that is typically received with pixel data on a rectilinear grid, but this is not essential. For example, video data on node 101 may represent a grid of pixels at any resolution (e.g., 640×480, 848×480, 1920×1080). Scanning laser projector 100 is a scanning projector that scans a raster pattern shown at 180. The raster pattern does not necessarily align with the rectilinear grid in the image source data, and image processing component 102 operates to produce display pixel data that will be displayed at appropriate points on the raster pattern. For example, in some embodiments, image processing component 102 interpolates vertically and/or horizontally between pixels in the source image data to determine display pixel values along the scan trajectory of the raster pattern.

Multi-level DAC(s) 110 receive digital display pixel data from image processing component 102, and produce an analog voltage or current to drive light source(s) 112. The number of data bits received by DAC(s) 110 determines a maximum number of grayscale levels that can be produced by a single light source. For example, five bits results in a maximum of 32 grayscale levels. However, because of component variations (e.g., power supply voltages, laser diode luminance/current characteristics), and other variables, more data bits may be required to faithfully reproduce a given number of grayscale levels. For example, eight or ten bits might be required to faithfully reproduce 32 grayscale levels.

Light source(s) 112 receive the output from DAC(s) 110 and produce light having grayscale values in response thereto. Light source(s) 112 may be monochrome or may include multiple different color light sources. For example, in some embodiments, light source(s) 112 includes red, green, and blue light sources. In these embodiments, image processing component 102 outputs display pixel data corresponding to each of the red, green, and blue light sources.

In some embodiments, light source(s) 112 may include one or more laser light producing devices. For example, in some embodiments, the light source(s) 112 may include laser diodes. In these embodiments, light source(s) 112 may also include driver circuits that accept and/or condition drive signals. For example, driver circuits may include transimpedance amplifiers, coupling circuits, bias circuits, switches, and the like. The light from light source(s) 112 is directed to mirror 162 via guiding optics 134, 136. Any type of optical element may be included in the light path between light source(s) 112 and mirror 162. For example, scanning laser projector 100 may include collimating lenses, dichroic mirrors, or any other suitable optical elements.

Scanning mirror 162 deflects on two axes in response to electrical stimuli received on node 193 from mirror drive circuits 116. While moving on the two axes, scanning mirror 162 reflects light provided by light source(s) 112. The reflected light sweeps a raster pattern and creates a resultant display at 180. The shape of the raster pattern swept by scanning mirror 162 is a function of the mirror movement on its two axes. For example, in some embodiments, scanning mirror 162 sweeps in a first dimension (e.g., horizontal dimension) according to a sinusoidal stimulus, resulting in a substantially sinusoidal horizontal sweep. Also for example, in some embodiments, scanning mirror 162 sweeps in a second dimension (e.g., vertical dimension) in response to sawtooth wave stimulus, resulting in a substantially linear and unidirectional vertical sweep.

MEMS device 160 is an example of a scanning mirror assembly that scans light in two dimensions. In some embodiments the scanning mirror assembly includes a single mirror that scans in two dimensions (e.g., on two axes). Alternatively, in some embodiments, MEMS device 160 may be an assembly that includes two scan mirrors, one which deflects the beam along one axis, and another which deflects the beam along a second axis largely perpendicular to the first axis.

Optical filter 170 is placed in the light beam path after scanning mirror 162. In some embodiments, optical filter 170 is characterized by a variable attenuation as a function of light position. For example, optical filter 170 may attenuate light less (or not at all) near the center of the filter, and attenuate light more near the edges of the filter. In some embodiments, the amount and gradient of attenuation may have an inverse relationship to brightness variations resulting from sinusoidal scanning. In this manner, optical filter 170 compensates for brightness variations due to sinusoidal scanning. Because an optical filter (rather than extra DAC bits) is compensating for brightness variations, the required number of DAC bits may be decreased, thereby reducing cost.

Optical filter 170 may provide the aforementioned compensation in the optical domain when placed anywhere in the beam path after scanning mirror 162. For example, in some embodiments, optical filter 170 is placed in a beam exit window of a projection device. Also for example, in some embodiments, optical filter 170 is combined with another optical device such as a lens or other correction optic.

Figure 2:
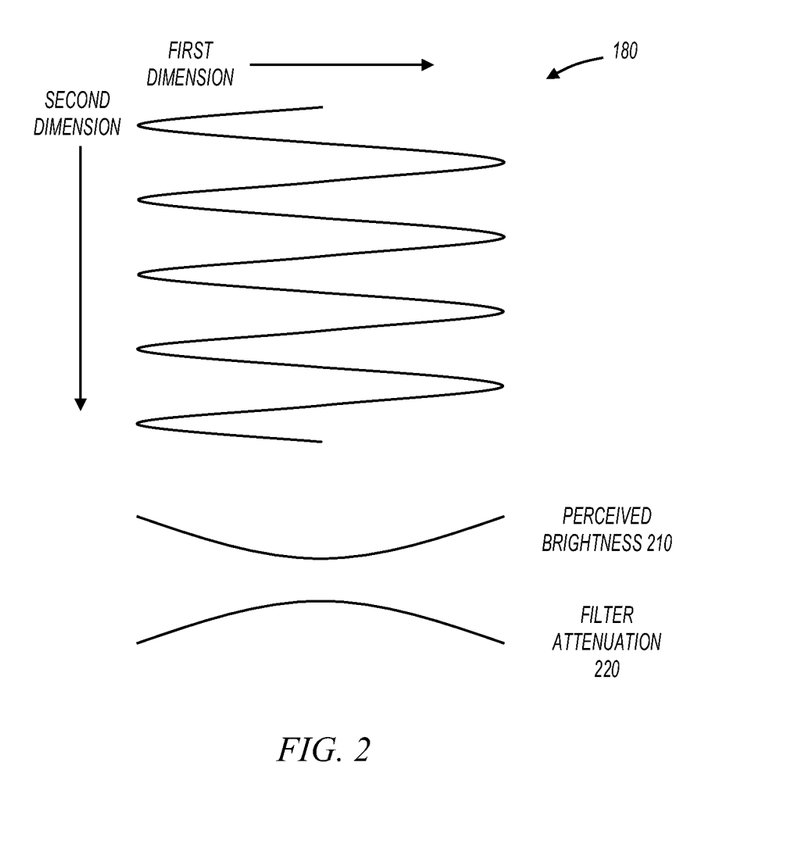
FIG. 2 shows a raster pattern with brightness variations in accordance with various embodiments of the present invention.

FIG. 2 shows a raster pattern with brightness variations in accordance with various embodiments of the present invention. Raster pattern 180 is shown and described in FIG. 1. Although raster pattern 180 shows only a few horizontal sweeps for each vertical sweep, this is not a limitation of the present invention. For example, in some embodiments, hundreds or thousands of horizontal sweeps occur for each vertical sweep.

FIG. 2 shows the horizontal direction as the "first dimension," and the vertical direction as the "second dimension." This is for naming convention purposes only, and a 90 degree rotation can result in the first dimension being the vertical direction and the second dimension being the horizontal direction.

Perceived brightness 210 represents the increased brightness near the left and right edges of the raster pattern prior to passing through optical filter 170. As shown in FIG. 2, this increased brightness may be a result of sinusoidal scanning in the first dimension. The increased brightness may occur, in part, because of increased pixel density as the scanned beam slows down near the left and right edges of raster pattern 180.

Filter attenuation 220 represents the variable attenuation of optical filter 170 in the first dimension. In embodiments represented by FIG. 2, the filter attenuation 220 is substantially the inverse of the perceived brightness 210 in the first dimension. In some embodiments, optical filter 170 exhibits a uniform attenuation in the second dimension. In other embodiments optical filter 170 exhibits a variable attenuation in both the first and second dimensions. Optical filter 170 may exhibit any combination of varying and/or uniform attenuation in either or both of the first and second dimensions without departing from the scope of the present invention.

After the sinusoidally scanned light beam passes through optical filter 170, the light beam exhibits a substantially uniform brightness across the raster pattern 180.

Sinusoidal compensation provided by optical filter 170 may decrease the required number of data bits in DAC(s) 110, thereby reducing cost. For example, without optical filter 170, scanning laser projector 100 (FIG. 1) may include DACs with extra data bits to compensate for light variations in the first dimension due to sinusoidal scanning. The inclusion of optical filter 170 obviates the need for these extra DAC bits.

Figure 3:
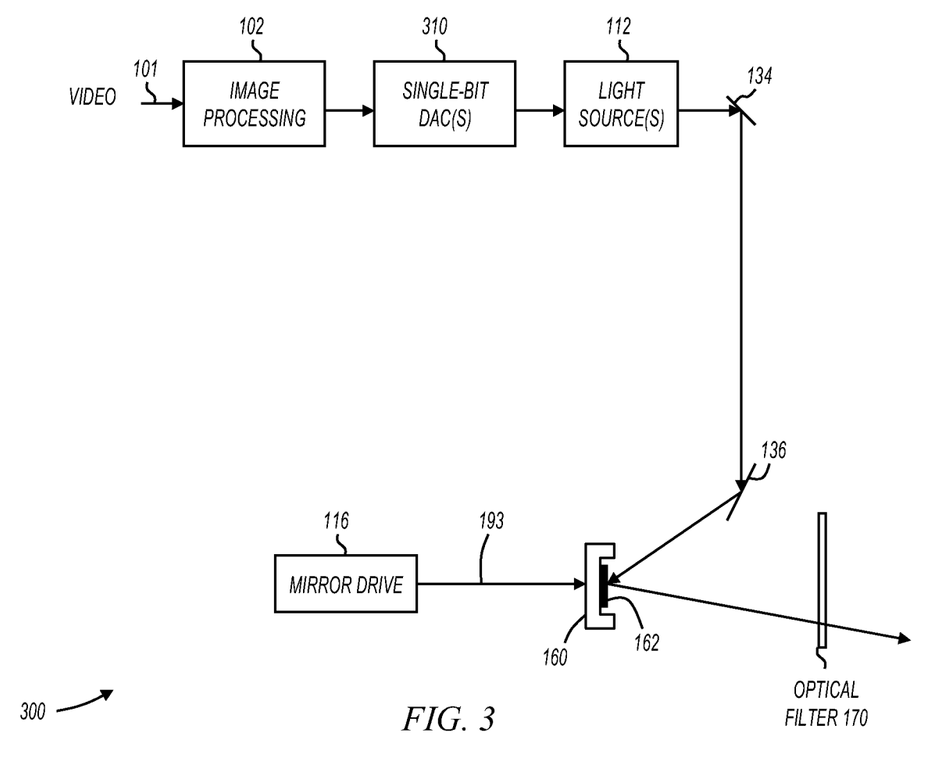
FIGS. 3 and 4 show scanning laser projectors in accordance with various embodiments of the present invention.

FIG. 3 shows a scanning laser projector in accordance with various embodiments of the present invention. Scanning laser projector 300 is similar to laser projector 100 (FIG. 1) except that the DAC(s) 310 only convert a single bit of information for each light source.

Scanning laser projector 300 with single bit DAC(s) 310 is useful when the application requires only display of two levels for each color, such as is common with text on black background, or a head-up display (HUD) application, where a substantial amount of the display is expected to remain "see-through". The light source driver need only provide an off state, and an on state, in which a constant drive value (voltage or current) is generated (a single bit DAC). In a color system that contains a red, blue, and green laser this still allows for generation of seven "colors" in addition to black.

Optical filter 170 allows operation of the sinusoidal laser scanning projector with a single bit DAC, in part because optical filter 170 obviates the need for extra DAC bits to compensate for brightness variations due to sinusoidal scanning.

Figure 4:
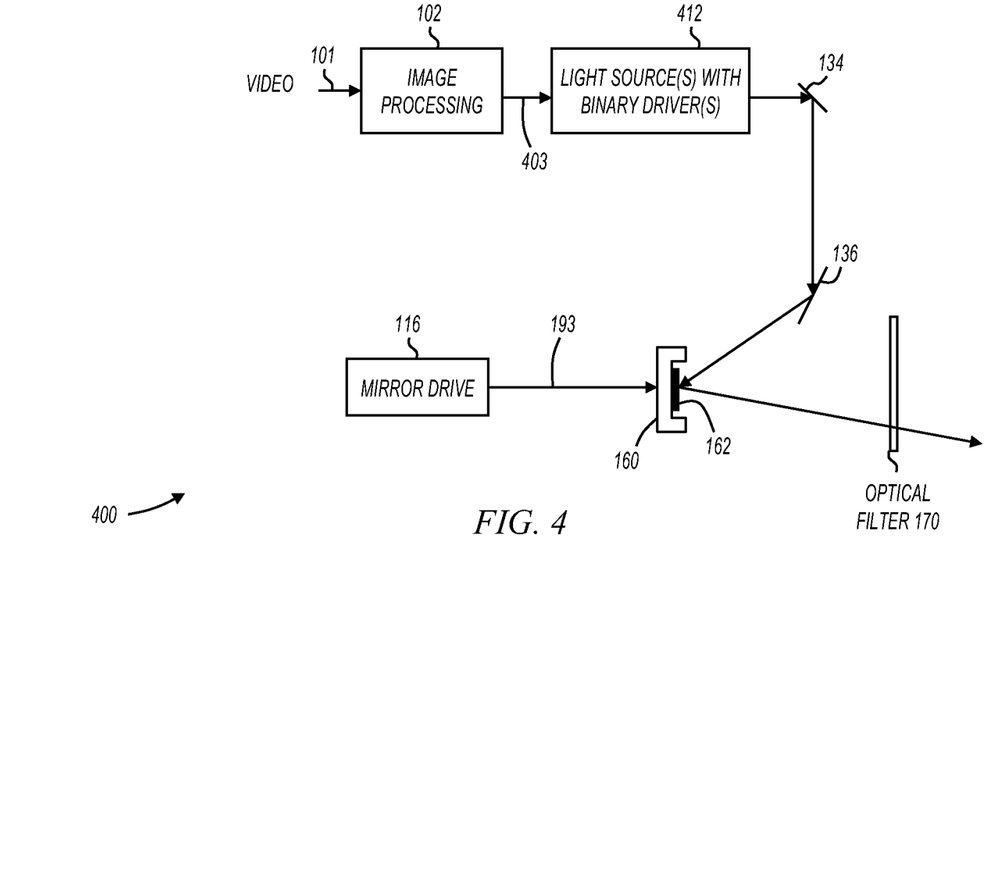

FIG. 4 shows a scanning laser projector in accordance with various embodiments of the present invention. Scanning laser projector 400 is similar to scanning laser projector 300 (FIG. 3), except that the DAC(s) and light source(s) are replaced by light source(s) with binary driver(s) 412.

The binary driver(s) turn the light source(s) on and off in response to a single bit video signal received on node 403. The binary drivers may include a single switch in series with light source such as a laser diode (see FIGS. 5 and 6), or may include any other mechanism to turn on and off a light source. A binary driver circuit is similar to a single bit DAC, but is potentially much simpler.

Figure 5:
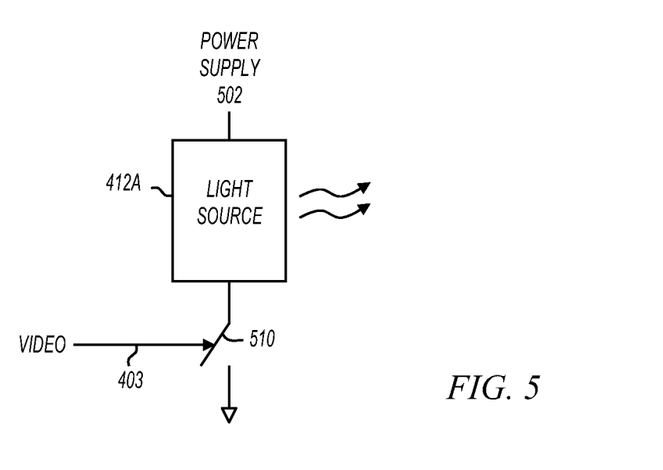
FIGS. 5 and 6 show laser light sources with binary drivers in accordance with various embodiments of the present invention.
Figure 6:
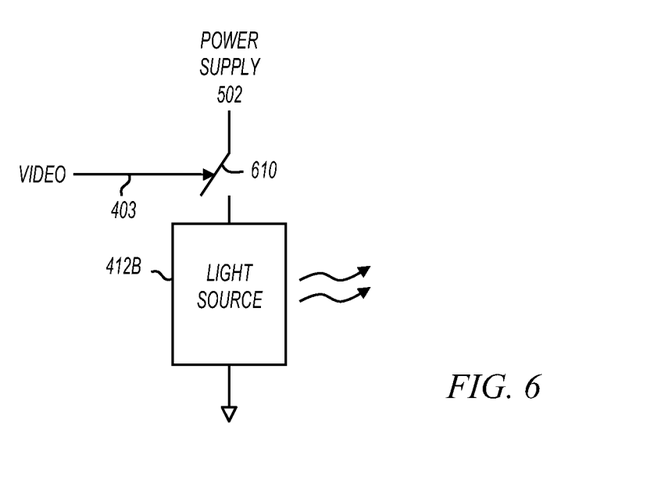

FIGS. 5 and 6 show laser light sources with binary drivers in accordance with various embodiments of the present invention. Referring now to FIG. 5, light source 412A is coupled in series with switch 510. Light source 412A is a current-driven light source. For example, in some embodiments, light source 412A is a laser diode that produces light when current flows. Switch 510 is coupled in a current path between light source 412A and a reference node. When switch 510 is open, no current flows, and light source 412A is off. When switch 510 is closed, current flows, and light source 412A is on. Accordingly, switch 510 functions as a binary driver that modulates light 412A on and off.

Referring now to FIG. 6, light source 412B is coupled in series with switch 610. Light source 412B is a current-driven light source. For example, in some embodiments, light source 412B is a laser diode that produces light when current flows. Switch 610 is coupled in a current path between light source 412B and power supply node 502. When switch 610 is open, no current flows, and light source 412B is off. When switch 610 is closed, current flows, and light source 412B is on. Accordingly, switch 610 functions as a binary driver that modulates light 412B on and off.

In some embodiments, the voltage on power supply node 502 is adjusted to cause the desired amount of current flow. The desired voltage may vary as the temperature of the light source varies and so may be adjusted over time. Various embodiments of the invention include control loops (not shown) to adjust the power supply voltage on node 502.

Figure 7:
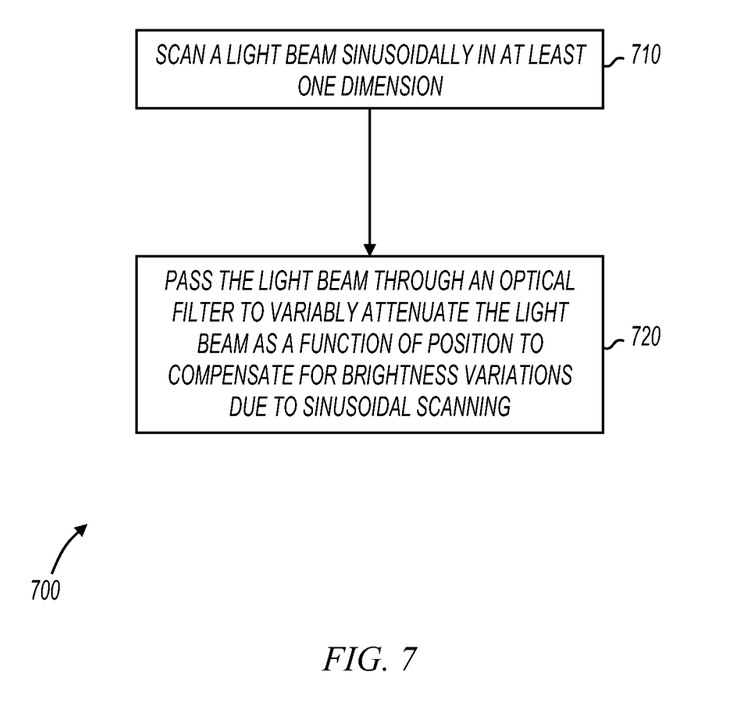
FIG. 7 shows a flow diagram of methods in accordance with various embodiments of the present invention.

FIG. 7 shows a flow diagram of methods in accordance with various embodiments of the present invention. In some embodiments, method 700, or portions thereof, is performed by a scanning laser projector, embodiments of which are shown in previous figures. In other embodiments, method 700 is performed by a series of circuits or an electronic system. Method 700 is not limited by the particular type of apparatus performing the method. Further, in some embodiments, some actions listed in FIG. 7 are omitted from method 700.

Method 700 is shown beginning with block 710. As shown at 710, a light beam is sinusoidally scanned in at least one dimension. In some embodiments, this corresponds to scanning mirror 162 scanning a light beam to create raster pattern 180. In some embodiments, the light beam is scanned sinusoidally in one dimension, and in other embodiments, the light beam is scanned sinusoidally in two dimensions. Further, the light beam may be scanned sinusoidally by a first mirror, and then scanned sinusoidally or otherwise by a second mirror.

At 720, the light beam is passed through an optical filter to variably attenuate the light beam as a function of position to compensate for brightness variations due to sinusoidal scanning. In some embodiments, this corresponds to optical filter 170 including variable attenuation characteristics as described with reference to FIG. 2.

Figure 8:
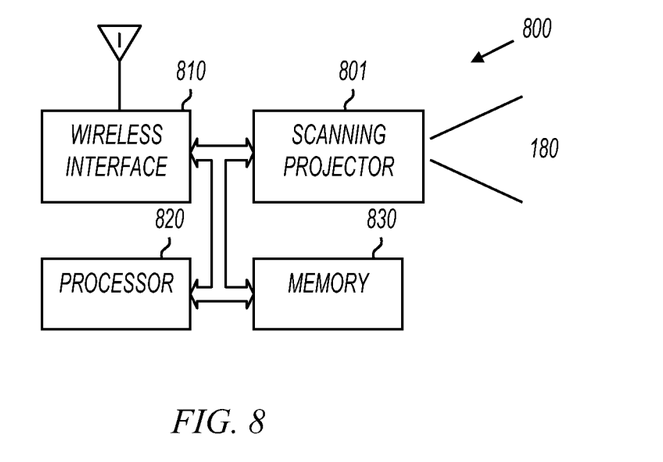
FIG. 8 shows a block diagram of a mobile device in accordance with various embodiments of the present invention.

FIG. 8 shows a block diagram of a mobile device in accordance with various embodiments of the present invention. As shown in FIG. 8, mobile device 800 includes wireless interface 810, processor 820, memory 830, and scanning projector 801. Scanning projector 801 paints a raster image at 180. Scanning projector 801 is a scanning laser projector as described above with reference to previous figures. Scanning projector 801 includes optical filter 170 and may include multi-bit DAC(s), single bit DAC(s), or binary drivers as described herein.

Scanning projector 801 may receive image data from any image source. For example, in some embodiments, scanning projector 801 includes memory that holds still images. In other embodiments, scanning projector 801 includes memory that includes video images. In still further embodiments, scanning projector 801 displays imagery received from external sources such as connectors, wireless interface 810, a wired interface, or the like.

Wireless interface 810 may include any wireless transmission and/or reception capabilities. For example, in some embodiments, wireless interface 810 includes a network interface card (NIC) capable of communicating over a wireless network. Also for example, in some embodiments, wireless interface 810 may include cellular telephone capabilities. In still further embodiments, wireless interface 810 may include a global positioning system (GPS) receiver. One skilled in the art will understand that wireless interface 810 may include any type of wireless communications capability without departing from the scope of the present invention.

Processor 820 may be any type of processor capable of communicating with the various components in mobile device 800. For example, processor 820 may be an embedded processor available from application specific integrated circuit (ASIC) vendors, or may be a commercially available microprocessor. In some embodiments, processor 820 provides image or video data to scanning projector 801. The image or video data may be retrieved from wireless interface 810 or may be derived from data retrieved from wireless interface 810. For example, through processor 820, scanning projector 801 may display images or video received directly from wireless interface 810. Also for example, processor 820 may provide overlays to add to images and/or video received from wireless interface 810, or may alter stored imagery based on data received from wireless interface 810 (e.g., modifying a map display in GPS embodiments in which wireless interface 810 provides location coordinates).

Figure 9:
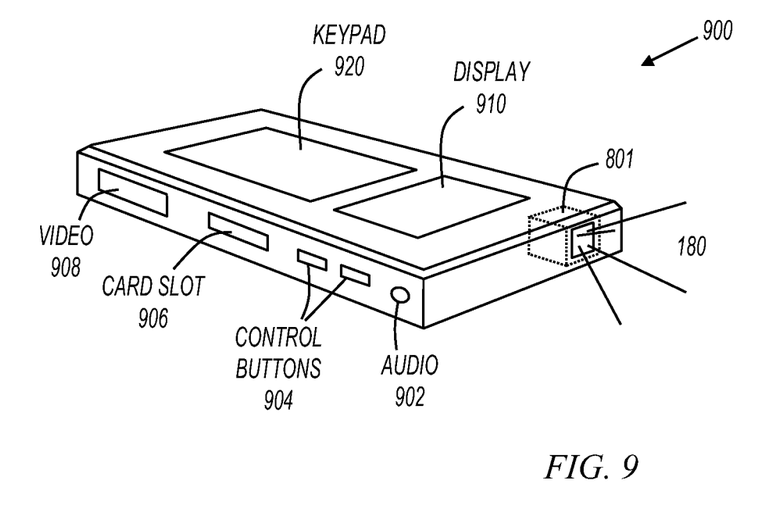
FIG. 9 shows a mobile device in accordance with various embodiments of the present invention.

FIG. 9 shows a mobile device in accordance with various embodiments of the present invention. Mobile device 900 may be a hand held projection device with or without communications ability. For example, in some embodiments, mobile device 900 may be a handheld projector with little or no other capabilities. Also for example, in some embodiments, mobile device 900 may be a device usable for communications, including for example, a cellular phone, a smart phone, a personal digital assistant (PDA), a global positioning system (GPS) receiver, or the like. Further, mobile device 900 may be connected to a larger network via a wireless (e.g., WiMax) or cellular connection, or this device can accept data messages or video content via an unregulated spectrum (e.g., WiFi) connection.

Mobile device 900 includes scanning projector 801 to create an image with light at 180. Mobile device 900 also includes many other types of circuitry; however, they are intentionally omitted from FIG. 9 for clarity.

Mobile device 900 includes display 910, keypad 920, audio port 902, control buttons 904, card slot 906, and audio/video (A/V) port 908. None of these elements are essential. For example, mobile device 900 may only include scanning projector 801 without any of display 910, keypad 920, audio port 902, control buttons 904, card slot 906, or A/V port 908. Some embodiments include a subset of these elements. For example, an accessory projector product may include scanning projector 801, control buttons 904 and A/V port 908.

Display 910 may be any type of display. For example, in some embodiments, display 910 includes a liquid crystal display (LCD) screen. Display 910 may always display the same content projected at 180 or different content. For example, an accessory projector product may always display the same content, whereas a mobile phone embodiment may project one type of content at 180 while displaying different content on display 910. Keypad 920 may be a phone keypad or any other type of keypad.

A/V port 908 accepts and/or transmits video and/or audio signals. For example, A/V port 908 may be a digital port, such as a high definition multimedia interface (HDMI) interface, that accepts a cable suitable to carry digital audio and video data. Further, A/V port 908 may include RCA jacks to accept composite inputs. Still further, A/V port 908 may include a VGA connector to accept analog video signals. In some embodiments, mobile device 900 may be tethered to an external signal source through A/V port 908, and mobile device 900 may project content accepted through A/V port 908. In other embodiments, mobile device 900 may be an originator of content, and A/V port 908 is used to transmit content to a different device.

Audio port 902 provides audio signals. For example, in some embodiments, mobile device 900 is a media player that can store and play audio and video. In these embodiments, the video may be projected at 180 and the audio may be output at audio port 902. In other embodiments, mobile device 900 may be an accessory projector that receives audio and video at A/V port 908. In these embodiments, mobile device 900 may project the video content at 180, and output the audio content at audio port 902.

Mobile device 900 also includes card slot 906. In some embodiments, a memory card inserted in card slot 906 may provide a source for audio to be output at audio port 902 and/or video data to be projected at 180. Card slot 906 may receive any type of solid state memory device, including for example, Multimedia Memory Cards (MMCs), Memory Stick DUOS, secure digital (SD) memory cards, and Smart Media cards. The foregoing list is meant to be exemplary, and not exhaustive.

Control buttons 904 may be used for any purpose. For example, in some embodiments, control buttons 904 may be used to navigate a menu system on display 910.

Figure 10:
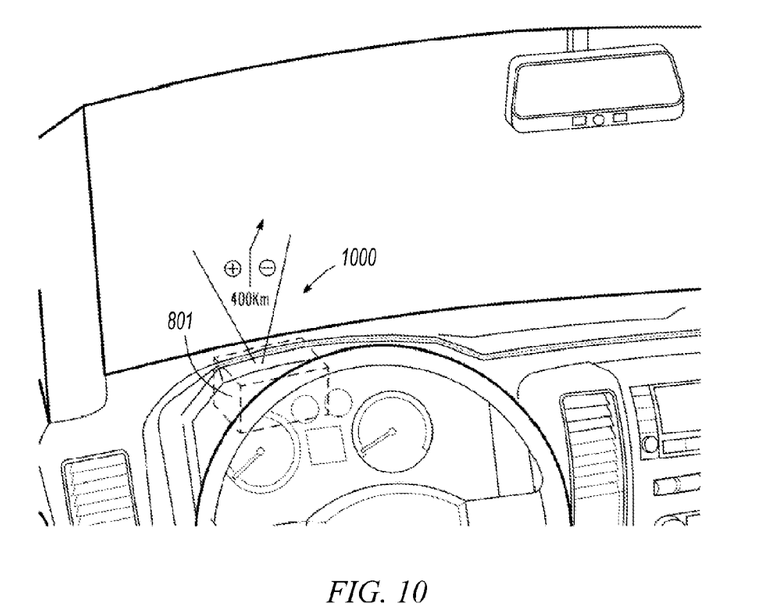
FIG. 10 shows a head-up display system in accordance with various embodiments of the invention.

FIG. 10 shows a head-up display system in accordance with various embodiments of the invention. Projector 801 is shown mounted in a vehicle dash to project the head-up display at 1000. Although an automotive head-up display is shown in FIG. 10, this is not a limitation of the present invention. For example, various embodiments of the invention include head-up displays in avionics application, air traffic control applications, and other applications.

Figure 11:
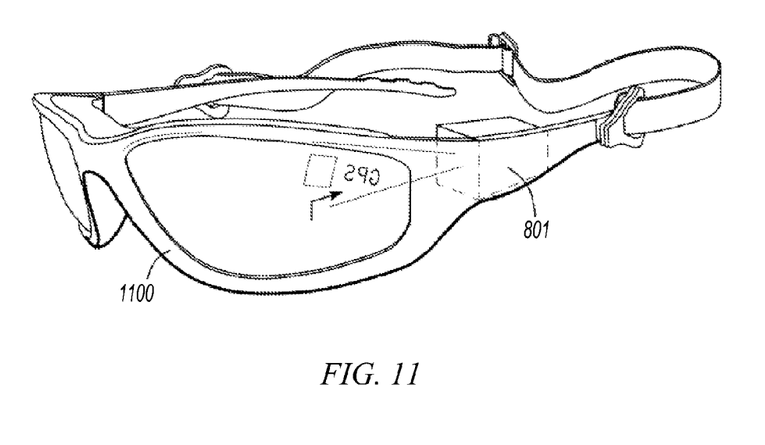
FIG. 11 shows eyewear in accordance with various embodiments of the invention.

FIG. 11 shows eyewear in accordance with various embodiments of the invention. Eyewear 1100 includes projector 801 to project a display in the eyewear's field of view. In some embodiments, eyewear 1100 is see-through and in other embodiments, eyewear 1100 is opaque. For example, eyewear 1100 may be used in an augmented reality application in which a wearer can see the display from projector 801 overlaid on the physical world. Also for example, eyewear 1100 may be used in a virtual reality application, in which a wearer's entire view is generated by projector 801. Although only one projector 801 is shown in FIG. 11, this is not a limitation of the present invention. For example, in some embodiments, eyewear 1100 includes two projectors; one for each eye.

Figure 12:
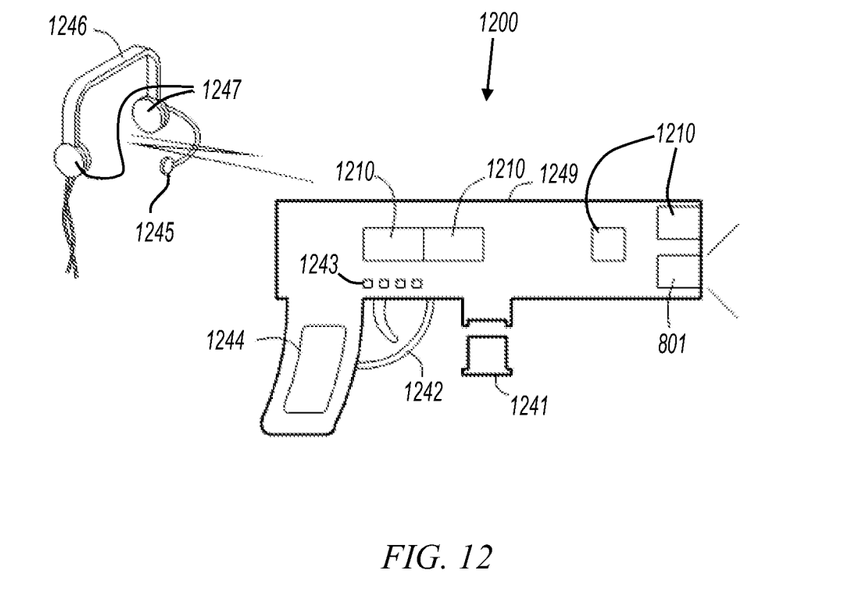
FIG. 12 shows a gaming apparatus in accordance with various embodiments of the present invention.

FIG. 12 shows a gaming apparatus in accordance with various embodiments of the present invention. Gaming apparatus 1200 allows a user or users to observe and interact with a gaming environment. The game is navigated based on the motion, position or orientation of gaming apparatus 1200, an apparatus that includes scanning laser projector 801. Other control interfaces, such as manually-operated buttons, foot pedals, or verbal commands, may also contribute to navigation around, or interaction with the gaming environment. For example, in some embodiments, trigger 1242 contributes to the illusion that the user or users are in a first person perspective video game environment, commonly known as a "first person shooter game." Because the size and brightness of the projected display can be controlled by the gaming application in combination with the user's movement, gaming apparatus 1200 creates a highly believable or "immersive" environment for these users.

Many other first person perspective simulations can also be created by gaming apparatus 1200, for such activities as 3D seismic geo-prospecting, spacewalk planning, jungle canopy exploration, automobile safety instruction, medical education, etc. Tactile interface 1244 may provide a variety of output signals, such as recoil, vibration, shake, rumble, etc. Tactile interface 1244 may also include a touch-sensitive input feature, such as a touch sensitive display screen or a display screen that requires a stylus. Additional tactile interfaces, for example, input and/or output features for a motion sensitive probe are also included in various embodiments of the present invention.

Gaming apparatus 1200 may also include audio output devices, such as integrated audio speakers, remote speakers, or headphones. These sorts of audio output devices may be connected to gaming apparatus 1200 with wires or through a wireless technology. For example, wireless headphones 1246 provide the user with sound effects via a Bluetooth connection, although any sort of similar wireless technology could be substituted freely. In some embodiments, wireless headphones 1246 may include microphone 1245 or binaural microphone 1247, to allow multiple users, instructors, or observers to communicate. Binaural microphone 1247 typically includes microphones on each ear piece, to capture sounds modified by the user's head shadow. This feature may be used for binaural hearing and sound localization by other simulation participants.

Gaming apparatus 1200 may include any number of sensors 1210 that measure distance, ambient brightness, motion, position, orientation, and the like. For example, gaming apparatus 1200 may detect absolute heading with a digital compass, and detect relative motion with an x-y-z gyroscope or accelerometer. In some embodiments, gaming apparatus 1200 also includes a second accelerometer or gyroscope to detect the relative orientation of the device, or its rapid acceleration or deceleration. In other embodiments, gaming apparatus 1200 may include a Global Positioning Satellite (GPS) sensor, to detect absolute position as the user travels in terrestrial space.

Gaming apparatus 1200 may include battery 1241 and/or diagnostic lights 1243. For example, battery 1241 may be a rechargeable battery, and diagnostic lights 1243 could indicate the current charge of the battery. In another example, battery 1241 may be a removable battery clip, and gaming apparatus 1200 may have an additional battery, electrical capacitor or super-capacitor to allow for continued operation of the apparatus while the discharged battery is replaced with a charged battery. In other embodiments, diagnostic lights 1243 can inform the user or a service technician about the status of the electronic components included within or connected to this device. For example, diagnostic lights 1243 may indicate the strength of a received wireless signal, or the presence or absence of a memory card. Diagnostic lights 1243 could also be replaced by any small screen, such as an organic light emitting diode or liquid crystal display screen. Such lights or screens could be on the exterior surface of gaming apparatus 1200, or below the surface, if the shell for this apparatus is translucent or transparent.

Other components of gaming apparatus 1200 may be removable, detachable or separable from this device. For example, the scanning laser projector may be detachable or separable from gaming housing 1249. In some embodiments, the subcomponents of the scanning laser projector may be detachable or separable from gaming housing 1249, and still function.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. A mobile device comprising: an image source; a laser light source; an image processing component to drive the laser light source based on pixel data received from the image source; a scanning mirror to reflect the laser light, the scanning mirror to nonlinearly scan in at least one dimension; and an optical filter positioned in a light path after the scanning mirror to variably attenuate the light beam in the at least one dimension; wherein the scanning mirror scans in two dimensions; and wherein the scanning mirror scans sinusoidally in a first dimension and substantially linearly in a second dimension.

2. The mobile device of claim 1 wherein the image processing component comprises a digital-to-analog converter to convert pixel data to laser drive values.

3. The mobile device of claim 2 wherein the digital-to-analog converter comprises a one bit digital-to-analog converter.

4. The mobile device of claim 1 wherein the image source comprises a wireless interface.

5. A scanning laser projector comprising: a scanning mirror to nonlinearly scan a light beam in at least one dimension; an optical filter to variably attenuate the light beam in the at least one dimension; and a laser light source to create the light beam; wherein the scanning mirror scans in two dimensions; and wherein the scanning mirror scans sinusoidally in a first dimension and substantially linearly in a second dimension.

6. The scanning laser projector of claim 5 wherein the optical filter variably attenuates the light beam to create a substantially uniform brightness in the at least one dimension.

7. The scanning laser projector of claim 5 further comprising a one bit digital-to-analog converter to drive the laser light source.

8. The scanning laser projector of claim 5 wherein the laser light source includes a circuit for off/on operation.

9. The scanning laser projector of claim 5 wherein the scanning mirror sinusoidally scans in the at least one dimension.

10. The scanning laser projector of claim 5 wherein the scanning mirror scans substantially linearly in a second dimension.

11. The scanning laser projector of claim 5 wherein the optical filter is located in a beam exit window of the scanning laser projector.

12. An apparatus comprising: a laser light source; a scanning mirror to scan sinusoidally in at least one dimension, the scanning mirror being positioned to scan reflected light received from the laser light source; and an optical filter to variably attenuate the reflected light as a function of position to compensate for brightness variations due to sinusoidal scanning; wherein the scanning mirror scans in two dimensions; and wherein the scanning mirror scans sinusoidally in a first dimension and substantially linearly in a second dimension.

13. The apparatus of claim 12 wherein the scanning mirror scans nonsinusoidally in a second dimension.

14. The apparatus of claim 12 wherein the laser light source includes a switch to modulate the laser light source on and off.

15. The apparatus of claim 12 further comprising a one bit digital-to-analog converter to drive the laser light source.

16. The apparatus of claim 12 wherein the optical filter is combined with a beam correction optic.

\* \* \* \* \*